United States Patent [19]

Gannon

[11] Patent Number: 5,260,092

[45] Date of Patent: Nov. 9, 1993

[54] HUSK-FREE PROTEIN FROM SPENT GRAINS OF BARLEY

[75] Inventor: James J. Gannon, Hawley, Pa.

[73] Assignee: F.I.N.D. Research Corporation, Brooklyn, N.Y.

[21] Appl. No.: 900,823

[22] Filed: Jun. 17, 1992

Related U.S. Application Data

[60] Continuation of Ser. No. 677,596, Mar. 26, 1991, abandoned, which is a continuation of Ser. No. 606,490, Oct. 31, 1990, abandoned, which is a continuation of Ser. No. 273,129, Nov. 16, 1988, abandoned, which is a continuation of Ser. No. 947,047, Dec. 29, 1986, abandoned, which is a division of Ser. No. 623,593, Jul. 31, 1984, Pat. No. 4,632,833, which is a division of Ser. No. 899,171, Apr. 24, 1978, Pat. No. 4,464,402.

[51] Int. Cl.⁵ .............................................. A23J 3/14
[52] U.S. Cl. ...................................... 426/656; 426/28; 426/31; 426/60
[58] Field of Search ................... 426/18, 28, 31, 60, 426/656

[56] References Cited

U.S. PATENT DOCUMENTS

| | | | |
|---|---|---|---|
| 3,212,902 | 10/1965 | Bavisotto | 426/31 |
| 4,311,714 | 1/1982 | Goering | 426/28 |
| 4,377,601 | 3/1983 | Dreese | 426/31 |
| 4,428,967 | 1/1984 | Goering | 426/28 |
| 4,613,506 | 9/1986 | Fulger | 426/28 |
| 4,632,833 | 12/1986 | Gannon | 426/31 |
| 4,656,040 | 4/1987 | Fulger | 426/31 |
| 4,804,545 | 2/1989 | Goering | 426/28 |
| 4,828,846 | 5/1989 | Rasco | 426/31 |
| 5,013,561 | 5/1991 | Goering | 426/28 |
| 5,061,497 | 10/1991 | Thacker | 426/31 |

*Primary Examiner*—Carolyn Paden
*Attorney, Agent, or Firm*—Donald P. Gillette

[57] ABSTRACT

A food material from the husk-free granular fraction of the spent grains of barley is disclosed. The food product is substantially free of fermentable sugars and contains substantially all of the proteins originally in spent grains.

16 Claims, 1 Drawing Sheet

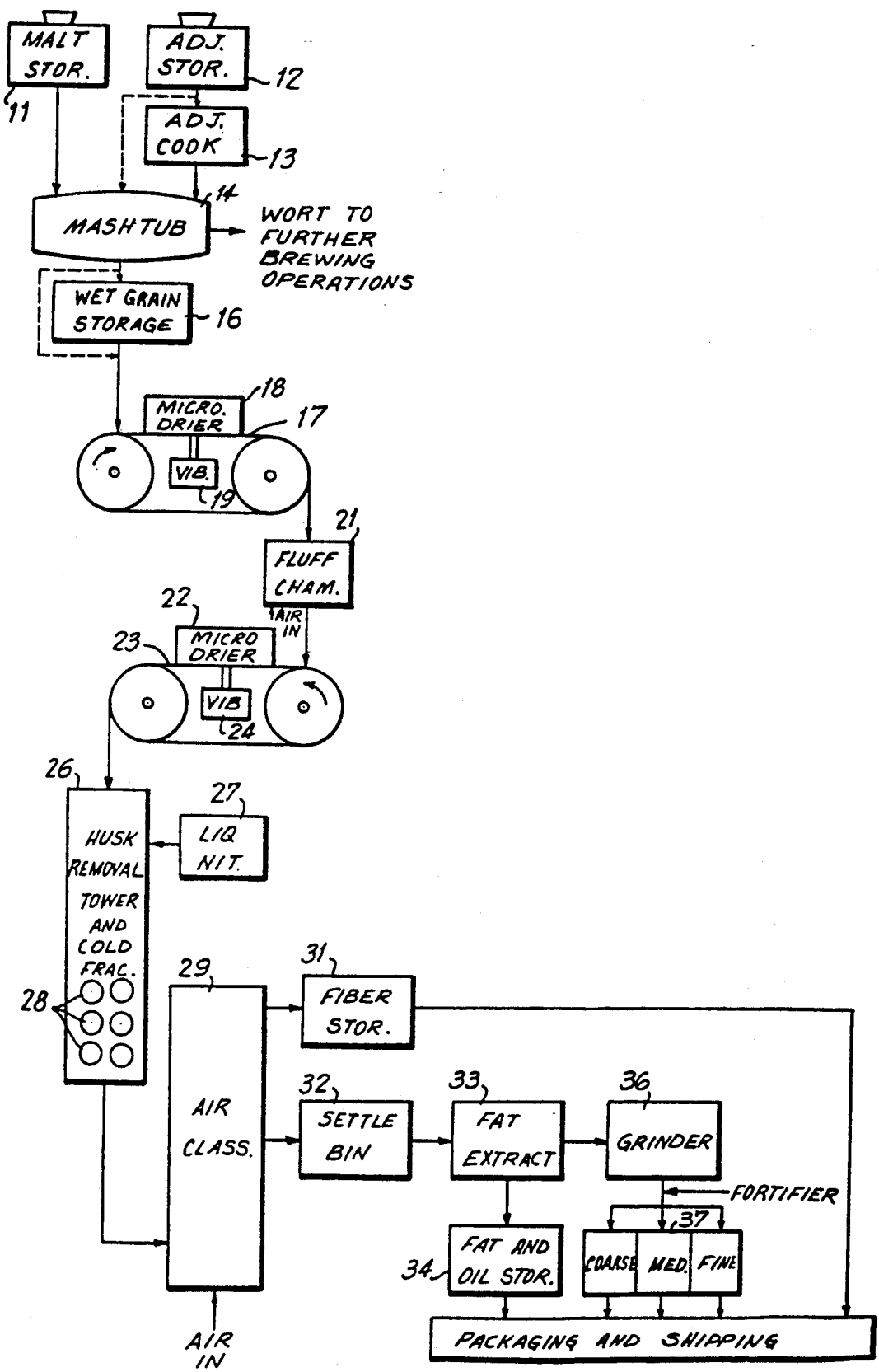

HUSK-FREE PROTEIN FROM SPENT GRAINS OF BARLEY

This is a continuation of application Ser. No. 677,596, filed Mar. 26, 1991 and now abandoned, which is a continuation of application Ser. No. 606,490, filed Oct. 31, 1990 and now abandoned, which is a continuation of application Ser. No. 273,129, filed Nov. 16, 1988 and now abandoned, which is a continuation of application Ser. No. 947,047, filed Dec. 29, 1986 and now abandoned, which is a division of application Ser. No. 623,593, filed Jul. 31, 1984, now U.S. Pat. No. 4,632,833, which is a division of application Ser. No. 899,171, filed Apr. 24, 1978, now U.S. Pat. No. 4,464,402.

BACKGROUND OF THE INVENTION

1. Field of the Invention

This invention relates to the field of high-protein food materials and the manufacture of such material from grain. In particular, the invention relates to a food product suitable for human consumption and substantially free of fibers, fats, and oils, the product being made from grain from which fermentable sugars have been largely extracted but having a higher protein fraction than any untreated grain, the protein fraction including effective amounts of all of the essential amino acids.

2. The Prior Art

There is currently a critical and increasing world food shortage. It is not only necessary that nations find ways to increase and to use effectively the total quantity of food available in the world but that the additional food have proper nutritional values. In particular, extra sources of protein are needed, since protein is the most important foodstuff.

The derivation of high-protein foods and food supplements from plants has been the subject of extensive investigation. Soybeans have long been known to be a good source of edible protein, and have been the subject of much study, but it is difficult to remove the basic bean taste from foods processed from soybeans, and therefore, soybean-based foods continue to be less desirable than their nutritional profile indicates that they should be. Cereal grains also contain substantial amounts of protein but generally have less nutritional value than soybeans. However, foods made from grain are not plagued by an undesirable bean taste.

There is a source of grain heretofore overlooked as being fit for human consumption. Substantial quantities of grain are used in the brewing industry and at the present time there is in excess of 1.5 million tons of spent grains produced each year as a byproduct of the brewing industry in the United States and four times that amount world-wide. The grains are referred to as "spent" because a large percentage of fermentable sugars has been extracted from them, leaving material that is of no further value in the production of beer. This material, when dried, consists of needlesharp particles due to the husks of the grains and, especially because of these husks, is not suitable for human consumption but is currently being sold as cattle food at a price of about one cent a pound on a dry basis. The removal of spent grains from the brewery poses potential, and sometimes actual, logistical problems, and spent grains are generally looked upon in the brewing industry as an undesirable but unavoidable waste material.

The husks of grain processed for direct human consumption as cereals, flour, etc. are not so troublesome because they are removed while the grain is still in the raw state. In that state, the husks are not bound tightly to the grains and are relatively easily removed. By the time grains have gone through the mashing process used to extract fermentable sugars in the production of beer and other alcoholic beverages, the husks have been cooked onto the grains, forming a tenacious, adhesive bond between each seed and its husk. This has heretofore presented an insuperable barrier to the use of brewers spent grains as a human food material, although the digestive system of cattle permits dried spent grains to be used as cattle food, for which brewers are paid very little.

The initial process steps applied to grains in brewing beer and the like result in the production of large amounts of undesirable sewage, the removal of which is entirely an expense. Not only are brewers required to pay high sewer taxes to the communities in which breweries are located, but because of their inability to control the quantity and nature of the material they deliver to the sewage system, the brewers also have to pay high sewage surcharges.

OBJECTS AND SUMMARY OF THE INVENTION

It is one of the objects of this invention to provide a food formulation that has a high-protein percentage and is substantially free of fibers, fats, and oils.

It is another object of the invention to obtain a food having high protein content by removing fermentable sugars from the grains and treating the resulting spent grains to remove the husks and fats and oils.

A particular object of the invention is to utilize brewers spent grains in the production of a high-protein food fit for human consumption.

Still another object of the invention is to provide a process for removing the husks of grains that have been cooked, and particularly grains that have been subjected to a mashing operation as part of a brewing operation.

A still further object of the invention is to produce a food product suitable for human consumption from brewers spent grains without the use of chemical additions or adulterants.

Still another object of the invention is to evaporate from brewers spent grains moisture that would otherwise have to be drained as a liquid into the sewer and be treated at high cost by a sewage disposal plant.

Further objects will become apparent from the following specification.

In accordance with this invention, grains, subjected to a mashing operation, is dried by the application of microwave energy, preferably accompanied by mechanical agitation, and is then subjected to extremely low temperature to embrittle the husks while the latter are mechanically fractured from the grains. After that the husks and grains are physically separated from each other, and the fats and oils in the grains are separated out by a solvent, leaving a granular material having a high proportion of protein. This material can be ground to various degrees of fineness as desired for processing into different kinds of food products.

BRIEF DESCRIPTION OF THE DRAWINGS

The only drawing is, basically, a flow chart of the equipment and process of the present invention.

DETAILED DESCRIPTION OF THE INVENTION

As the source of enzymes for mashing, and because of its decisive influence on the characteristic taste of beer, barley malt is the one indispensable brewing material. Malting is simply the controlled germination of grain, the germination being stopped at a desired stage by means of heat. The purpose of malting the barley is to develop the dormant enzymes of the barley so that they can break down the carbohydrates and release the fermentable sugars. Malted barley has a yield of soluble substances of about 72% to 76%, dry basis, which is about a five-fold or six-fold increase over the yield of unmalted barley.

The initial stage in the brewing operation, proper, is the mashing stage in which malted barley, usually referred to simply as malt, that has been crushed between rollers is mixed with water in large tubs until it forms a mash having the consistency of porridge. The malt can be used alone in forming the mash, and in Germany, for example, this is mandatory. In other countries, for example the United States of America, adjuncts, such as corn grits or flakes or rice or other materials having high percentages of fermentables, can be added. Malt and adjunct are stored in bins 11 and 12 before being used. In the case of corn grits and rice, these adjuncts must be gelatinized by being boiled in a cooker 13 before being added to the mash in the mashtub 14. Corn flakes, having been subjected to pre-gelatinization, require no further boiling but can be added directly to the mash.

The mash is heated in steps going from about 100° F. to about 170° F. in a cycle of operation chosen by the brewer. The cycle is normally divided into steps to allow various enzymes to act at the temperatures best suited to such actions. Thereafter, the spent grains settle to the bottom of the tub to form a filter bed through which the liquid, called "wort", is filtered, or lautered.

One of the reasons for using barley is that the structure of the barley husks makes the bed of spent barley grains especially suitable as a filter. If the mashing operation just described were applied to a different grain, not so much for the purpose of producing wort and eventually beer but more specifically for the purpose of producing spent grains having the highest possible protein content by using grains having the highest available natural protein, it might be necessary to provide additional filtering means to allow the wort to be removed without washing away the spent grains. The choice of grains to be used may well be economically dictated by the fact that the profit that can be made by a brewer from the high protein material made by the process of this invention may be greater then the profit obtainable from the beer produced from that grain. In short, the by-product may become the main product and vice versa.

After lautering, sparge water is flushed through the spent grains and is combined with the wort. Sparging is continued until analysis of the sparge water shows only about one percent or one and a half percent of extract. The bed of spent grains having a moisture content of about 75% to 80% must then be removed from the tub as quickly as possible to permit a fresh batch of malt to be put in to start a new mashing operation. While the fastest way of disposing of the spent grains might be to wash them down the sewer, the enormous load that this would place on the sewage disposal system makes this method of disposal impractical.

The usual practice is to haul the soggy mass of spent grains away from the brewery in large trucks as soon as a mashing operation has been completed, although some breweries store the wet grains in storage tanks and do not use trucks. Any delay in removing the spent grains from the mashtubs quickly brings the brewing operation to a halt, and if trucks are used, it is preferable to have the trucks waiting at the brewery prior to the end of each operation, even if this is not efficient use of the trucks.

The spent grains are stored for later use as cattle feed but before being stored must be dried. The conventional drying method used at the present time is to remove the surface effluent from the soggy spent grains by a dewatering screen and then to subject the spent grains to the squeezing mechanical action of a Davenport press to effect further moisture reduction. Virtually all of the effluent removed by this conventional technique goes into the sewer and places a substantial load on the sewage disposal system.

Even though the drying operation usually takes place away from the brewery (it could be carried out at the brewery before the spent grains area hauled away), a large percentage of the sewer tax the brewery is required to pay is calculated on the basis of the effluent removed in the drying operation. The sewer surcharge that must be paid by the brewery is a function of four pollutants, the worst of which is the spent grains effluent resulting from the drying operation. The others are: beer spillage, yeast spillage, and caustic (pH treatment).

In determining the spent grains effluent, no physical measurement of the volume or weight of spent grains produced at the brewery is made. Instead, the surcharge is determined, usually, in one of two ways. One way is to weigh the amount of malt and adjunct that enters the plant and to measure the water input in cubic feet. The figures thus obtained are put into an equation that considers the process at the brewery and determines the amount of effluent that will go into the sewer. The brewer is billed accordingly.

Another way is to use an effluent sample that operates as an "in-line sample" to take composites of the effluent grains line over a period of time. The B.O.D. (biologic oxygen demand) of the effluent samples. and the amount of malt, adjunct, and water purchased are used to calculate the sewer surcharge. If the B.O.D. in the samples exceeds a minimum value, an additional fine is added to the basic sewer tax. Even when the grains are dried at a location away from the brewery, the tax surcharge is made to the brewer because the calculation includes the brewers, raw materials. In addition, there are always some grains washed into the sewer when the mash tubs are cleaned and some more due to washings from the conveyors, but these amounts are small compared to the effluent that comes from the drying operation.

At the present time, the handling of spent grains is being subjected to an increasing amount of direct environmental control, as well as indirect control through taxation, by communities in which breweries are located. A brewery having a capacity of a million barrels can deposit, through effluent grains waste, enough polluting material to require the same amount of sewage water treatment as would be required by a town having a population of 25,000 citizens. Most towns today require installation of a total recovery system that, in essence, evaporates all of the water from the spent grains and incorporates a sludge removal system with chemical treatment. This imposes heavy fuel costs on the brewery, virtually eliminates pressing operations used up to the present time, and triples the drying operations in conventional cylindrical rotary drum driers used heretofore.

Communities are also becoming increasingly concerned about air pollution. Special afterburners are being required to be installed to burn off all of the fine dust particles that pollute the air and produce an odor in the vicinity of the brewery. The cost of fuel for total recovery systems is four times as great as the cost for standard systems used for the past fifty years but which are now being outlawed by more and more cities. Furthermore, the pollution control equipment in existence up until now requires a great deal of space and operates slowly.

In accordance with one aspect of this invention, the soggy spent grains are not hauled away from the brewery. Instead, they may be temporarily stored in a container 16 or else transferred directly to a conveyor 17 that carries them directly through an industrial microwave drier 18 operating at a frequency and output power high enough to impart sufficient energy to vaporize the moisture contained within the grains. While the grains are passing through the microwave drier 18 on the conveyor 17, they are also subjected to mechanical vibration by a vibrator 19 to make it easier for the moisture to escape. The Federal Communications Commission has authorized frequencies of 915 MHz and 2450 MHz for microwave drying equipment, and the higher of these frequencies is preferable for initial drying operation, but other frequencies may be used when and if their use is authorized.

Drying the spent grains by microwave energy results in great financial savings to the brewer in reducing the spent grains effluent portion of the sewer tax and surcharge. A brewery paying an annual surcharge of $700,000 due to effluent grains pollution could eliminate that charge, although the brewery would have to pay about one-tenth of that amount as additional annual utility cost. The cost of installing the microwave driers would be about $500,000.

A peculiar aspect of brewers grains is that the concentration of moisture is not on the surface, as it is in almost all other products, but is trapped inside the kernels of the grains so that it is quite difficult to remove quickly and inexpensively. Microwave energy is absorbed by the electrically bipolar water molecules in the kernels to bring the temperature of the water in the wet grains rapidly to 212 F. None of the microwave energy is wasted in heating the air or the spent grains material, so that the electric power required to generate the microwaves is very efficiently utilized. The drying time is reduced by as much as 85% in comparison with hot air drying, and the microwave drier occupies only about 25% of the space required for a hot air drier. Simply because of the length of time the spent grains have to remain in a conventional drier, such driers lose more than half of the heat generated and, therefore, more than half of the power supplied from the power lines.

Because microwave energy removes the water quickly and without raising the temperature of the grains excessively, it does not adversely affect the nutritional value, or profile, of the grains. All of the normally effluent water is transformed into steam, thereby eliminating a major pollution problem of the brewing industry.

Removal of such high moisture content by application of microwave energy is also unique because there are very few products that have an 80% moisture content prior to drying. A 35% moisture content in a material to be dried is considered quite high.

I have found it preferable to divide the microwave heating into two separate stages. In the first stage the percentage of moisture in the grains is reduced from the initial approximately 80% value to about 12% to 30% and preferably to about 20%. I have found that the use of microwave energy achieves this reduction in moisture content in the same length of time that would be required to reduce the moisture from the 80% level to 75% in a conventional hot air drying system After passing through the first microwave heating unit 18 the partially dried grains enter a fluffing chamber 21 in which the grains are further agitated by warm air currents for surface rotation. This fluffing operation has been found to be very beneficial in helping to dry the grains quickly without adversely affecting the nutritional profile.

After being fluffed, the grains are conveyed, as part of the continuous drying process, through a second microwave drier 22 by a conveyor 23 to reduce the moisture content further to approximately 6% to 10% and preferably to 8%, which is the desired amount for storage of the grains. Grains having more the 8% moisture become rancid more quickly; those having less than about 8% are more subject to catching fire. The conveyor 23 is also oscillated mechanically by a vibrator 24 while passing through the drier 22 to aid in releasing vaporized water from the vicinity of the grains. Since less energy is required to effect moisture removal in the second microwave drier, the microwave frequency can be lower, for example, the standard 915 MHz, or other frequencies, if they are authorized. This double microwave system achieves a high degree of uniformity of the dried grains and maintains the nutritional profile. The water is removed as steam, and there are no wastes or pollutants.

A further advantage of the use of microwaves in drying is that they sterilize the product. Salmonella and Staphylococci are killed by microwave heat, and any insect eggs are also destroyed. Such eggs may be produced in the spent grains by insects attracted to the soggy mass after it has left the tub 14 and before it enters the microwave heating driers. Furthermore the soggy spent grains are an excellent medium for bacterial growth, and microwave energy eliminates all bacterial problems.

Dried grains from the second microwave drier 22 are conveyed to a chamber 26 cooled to a very low temperature. This chamber may be a tower into which the grains are fed at the top and cooled by a suitable cooling, preferably liquid nitrogen sprayed from a source 27 onto the falling grains to come into momentary contact with them. Alternatively, the grains may pass through a liquid nitrogen bath. In either case, the grains are brought to an exceedingly low, sub-freezing temperature and fed between mechanical rollers 28 to be fractured by rubbing abrasive action. The rollers may be located at the bottom of the tower and may consist of a triple set of rollers for optimum operation. The grinds of these rollers can be set from medium-coarse to fine.

Liquid nitrogen has several advantages. For one thing it provides the temperature necessary to separate the husks and fibrous fractions from spent grains, a procedure that could not be carried out satisfactorily with conventional techniques used by millers. Standard milling operations are applied to grains that have not undergone a cooking process. The husks of uncooked grains are relatively easy to remove, but the husks and fibrous material of spent grains are difficult to separate from the grains themselves because carbohydrate and protein material resulting from incomplete removal during the leaching and sparging processes in the brewery forms films that are solidified during the drying operation and act as an adhesive that binds the husks and fibrous materials more tenaciously to each seed. A relatively small amount of husks and fibrous material is already separated at the time the grains reach the rollers 28 at the output of the cooling tower 26, but the greater portion of the husks and fibrous material is bound to the grains by means of the films just described.

Although it is the drying operation that sets the adhesive film, it is the cooking operation in the mashtub 14 that preceded the drying operation that caused the film to be generated. Yet the cooking operation is necessary, not only because it is required to obtain the wort in producing beer but also because it is the part of the process that removes a substantial fraction of the total grain material and leaves the remainder with a higher protein percentage by virtue of the removal of the non-protein material.

The embrittlement of the grains by the liquid nitrogen causes individual pieces of crushed grains to fracture quite easily in the rollers 28, which makes it easier to dislodge the fibrous fractions from the grain pieces. The grain is kept at a very low temperature during the abrasive action to facilitate the fracture between the grain and the fibrous portion.

An additional important reason for choosing liquid nitrogen as a coolant is that it is non-toxic. As it evaporates, it simply becomes part of the atmosphere and has no ill effects on anyone who may breathe it. It also has no ill effects on the grains being processed. Liquid nitrogen is commonly used in processing of frozen foods and thus represents a material that has already been approved by appropriate governmental agencies. It cannot leave any residue or have any chemical reactions with the spent grains. It is readily available and is economical to use and is generally preferred for producing extremely low temperatures in food manufacturing operations. Its use in helping to fracture the piece of crushed grain in the present invention is not to freeze the grains but to bring them to an extremely low temperature, thereby making the adhesive film brittle.

The fractured material passes into an air-classification chamber 29, usually a vertical tower in which air is blown up through the fractured material, causing both the husks and the fractured grains to rise. The husks are less dense and are therefore carried to higher points by the rising air so that they may be drawn off and stored in suitable receptacles 31 for later use. The more dense granular material is drawn off at lower levels from the air-classification chamber and stored in a bin 32 for a period of at least 45 minutes to three hours, but preferably at least one hour, to allow settling of both the granular material and dust.

The husks taken from the air-classification chamber receptacles may be ground further according to specifications furnished by a purchaser. Fibrous materials have recently become popular as food additives because of the beneficial effects attributed to the inclusion of fibers in human diet.

After the grains have been allowed to settle, the fats and oils are extracted by a suitable solvent in an extraction chamber 33. The solvent must be non-toxic and volatile so as to leave no residue on the grains nor impart any undesirable flavor to them. Petroleum ether may be used as a solvent, but hexane, which is well known as a solvent in the food industry, is preferred. The solvent is passed through grains to dissolve the fats and oils so that the latter may be drawn off into a storage tank 34, leaving fat-free grains that are also free of husks. These grains, now devoid of husks, oils, and fats are in condition to be put through a milling and grinding operation in a grinder 36, for example an alpine impact mill, with a special liquid nitrogen cooling chamber. The mill may be set to grind the fat-free grains into whatever particle size is desired by the purchaser and stored in sections of a container 37 according to particle size. For example, bakeries will normally require grain ground into a flour, while manufacturers of meat extenders require a semi-coarse grind.

The material may be fortified at this stage to raise the protein content by yeast injection or to adjust the nutritional profile by the addition of suitable amino acids or to insert flavoring material of any desired type. These fortifications are not mutually exclusive, but instead, two or more can be carried out on the same granular material.

In the case of the addition of food flavors, the fact that the granular materials produced according to this invention have no strong taste of their own to be overcome, in contrast to soybean material, is an advantage. Thus, any type of flavoring can be added, a fact that has been found to be unexpectedly important in the case of high-protein material to be furnished to people in certain countries. It has been found in the past that there are ethnic groups indigenous to certain countries who insist upon certain flavors and reject other flavors, even though their total diet may be marginal in quantity. A lack of a pronounced adverse taste in the material provided by the present invention makes it easy to satisfy such people. Of course, the lack of an irremovable distinct taste that is unpleasant in certain combinations of tastes is advantageous in all kinds of food products.

After the grain has been fortified, if such fortification is considered necessary, it may be packaged or sent to a bulk storage location. It is preferable to limit storage to approximately 40,000 pounds per bin for safety and ignition considerations.

The quality of the protein material produced by the process just described is illustrated in the analysis in Table I. In this sample, the starting material had a relatively high amount of protein. However, even with lower initial protein, this invention enhances the concentration and no grain-based food having a protein percentage in excess of about 36% and free of fats and oils and fibers has been known heretofore. The profile of the material represented in Table I in which the protein is concentrated to 41% is typical of what may be expected from brewers spent grains obtained in the northeastern section of the United States. Proteins taken form grains in other parts of the country and in other parts of the world will vary to some extent, but in all cases, the percentages of protein will be higher than has been obtainable in the past.

Not only is the total quantity of protein high, but the percentage represented by those amino acids deemed beneficial to the diet is also high. As may be seen, these amino acids, which are specifically named in Table I, account for about 35% of the total grain, and the additional approximately 6% of protein that is not of particular nutritional value.

TABLE I

| NEW ENRICHED PROTEIN GRAIN | |  |
|---|---|---|
| PROTEIN | 41.0% | |
| MOISTURE | 8.0% | |
| ASH (minerals) | 4.0% | |
| FATS & OIL | 0 | |
| FIBER | 0 | |
| CARBOHYDRATES | 47.0% | |
| AMINO ACIDS (Nutritional Profile) | | |
| Arginine | 1.57% of the grain | 3.8% of protein |
| Histidine | .74 | 1.8 |
| Isoleucine | 1.50 | 3.7 |
| Lysine | .95 | 2.3 |
| Leucine | 4.08 | 9.9 |
| Methiaonine | .62 | 1.6 |
| Phenylalinine | 1.95 | 4.7 |
| Threonine | 1.19 | 2.9 |
| Tryptophan | .31 | .76 |
| Tyrosine | 1.12 | 2.7 |
| Valine | 1.83 | 4.6 |
| Aspartic acid | 2.37 | 5.8 |
| Serine | 1.55 | 3.8 |
| Glutamic acid | 7.93 | 19.3 |
| Proline | 3.80 | 9.2 |
| Glycine | 1.15 | 2.8 |
| Alanine | 2.33 | 5.7 |

Table II shows a protein profile that has been deemed to represent a high-quality protein. This table includes information taken from Recommended Dietary Allowances, ed. 8, Washington, D.C. 1974, Food and Nutrition Board, National Research Council, p.44, as published by Orten, J. M. and Newhaus, O. W., in *Human Biochemistry*, published by the C. V. Mosby Company (1975), p.523. Comparison of the column entitled "Amino acid pattern for high-quality protein (mg/gm of protein)" which was copied from the Orten and Newhaus book, with the column titled "New Formulation", which represents the amino acid profile of the high-protein food according to the present invention, shows that the profile of the new formulation compares favorably with the desired pattern and has no serious amino acid deficiencies.

This invention has been described in terms of specific materials and processes, but it will be obvious to those skilled in the art that modifications may be made therein within the scope of the invention as defined by the following claims.

TABLE II

| Amino acid | Amino acid pattern for high-quality proteins (mg/gm of protein) | New Formulation |
|---|---|---|
| Histidine | 17 | 18 |
| Isoleucine | 42 | 37 |
| Leucine | 70 | 99 |
| Lysine | 51 | 23 |
| Total S-containing amino acids (Met, Cys) | 26 | 16 |
| Total aromatic amino acids (Phe, Tyr) | 73 | 74 |
| Threonine | 35 | 29 |
| Tryptophan | 11 | 7.6 |
| Valine | 48 | 46 |

What is claimed is:

1. A food material suitable for human consumption and comprising the husk-free granular fraction of spent grains of barley, said spent grains being substantially free of fermentable sugars, said granular fraction retaining, substantially chemically unchanged, substantially all of the proteins originally in the spent grains of barley, said retained proteins having an amino acid profile including nutritionally effective quantities of histidine, isoleucine, leucine, lysine, total S-containing amino acids, total aromatic amino acids, threonine, tryptophan, and valine.

2. The food material of claim 1 in which the proteins in the granular fraction constitute at least about 36%, by weight, of the total food material.

3. The food material of claim 1 in which the proteins in the granular fraction constitute not substantially less than 41%, by weight, of the total food material.

4. The food material of claim 1 further comprising yeast fortification material.

5. The food material of claim 1 further comprising amino acid fortification material.

6. The food material of claim 5 further comprising yeast fortification material.

7. The food material of claim 1 further comprising taste fortification material.

8. The food material of claim 7 further comprising amino acid fortification material.

9. A food material suitable for human consumption and comprising the granular fraction of brewers' spent grains of barley substantially free of fermentable sugars and husks and retaining a high percentage of proteins originally in the grains, said retained proteins in the food material containing nutritionally effective quantities of histidine, isoleucine, leucine, lysine, total S-containing amino acids, total aromatic amino acids, threonine, tryptophan, and valine and being substantially chemically unchanged from the proteins in the spent grains.

10. The food material of claim 9 comprising approximately 6% to about 10% moisture.

11. The food material of claim 10 comprising approximately 8% moisture.

12. The food material of claim 9 in which the brewers, spent grains are fractured grains.

13. The food material of claim 9 ground to a predetermined particle size.

14. The food material of claim 13 ground to flour.

15. The food material of claim 13 substantially devoid of fats and oils.

16. A food material suitable for human consumption and comprising the granular fraction of brewers' spent grains of barley, the spent grains being substantially free of fermentable sugars, the granular fraction containing proteins that have nutritionally effective quantities of histidine, isoleucine, leucine, lysine, total S-containing amino acids, total aromatic amino acids, threonine, tryptophan, and valine, said food material being substantially free of husks and retaining a high percentage of proteins originally in the spent grains, said retained proteins in the food material being substantially chemically unchanged from the proteins in the spent grains and thereby retaining nutritionally effective quantities of histidine, isoleucine, leucine, lysine, total S-containing amino acids, total aromatic amino acids, threonine, tryptophan, and valine.

* * * * *